Jan. 1, 1924
1,479,192
F. J. LUDDEN
GASOLINE COMBINATION VALVE LOCK
Filed April 11, 1921    2 Sheets-Sheet 1
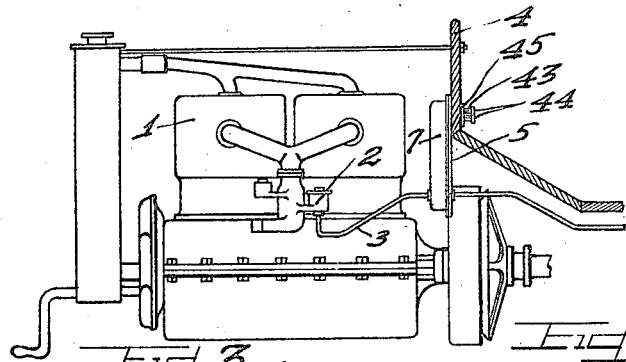
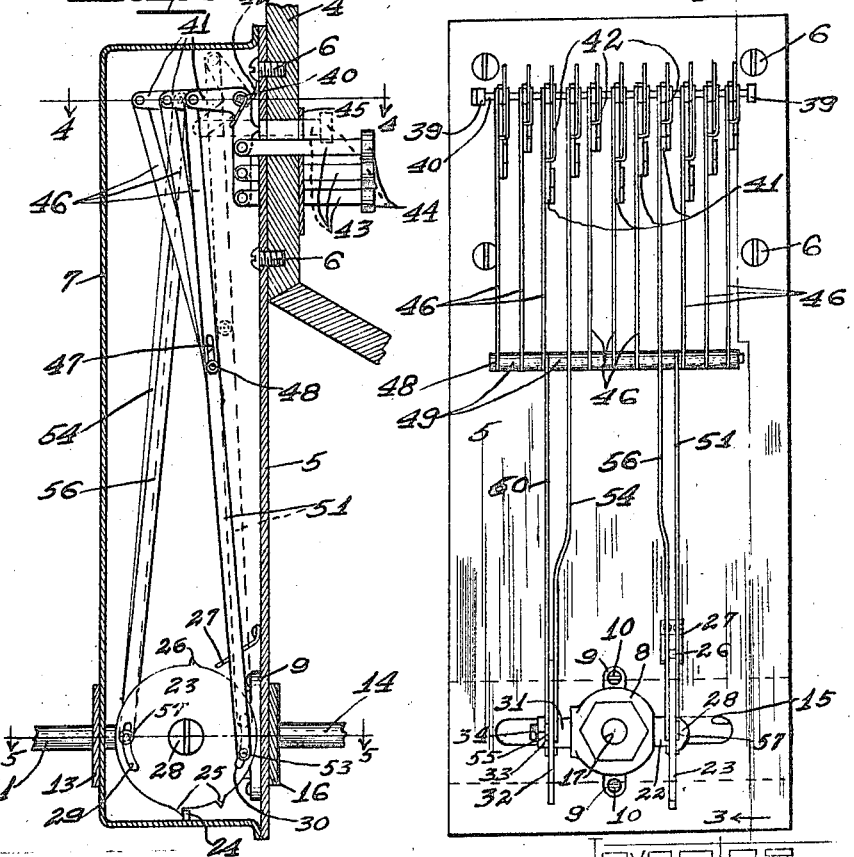
Witnesses
Rudolph T. Berg.
Inventor
FRED J. LUDDEN.
By
Atty.

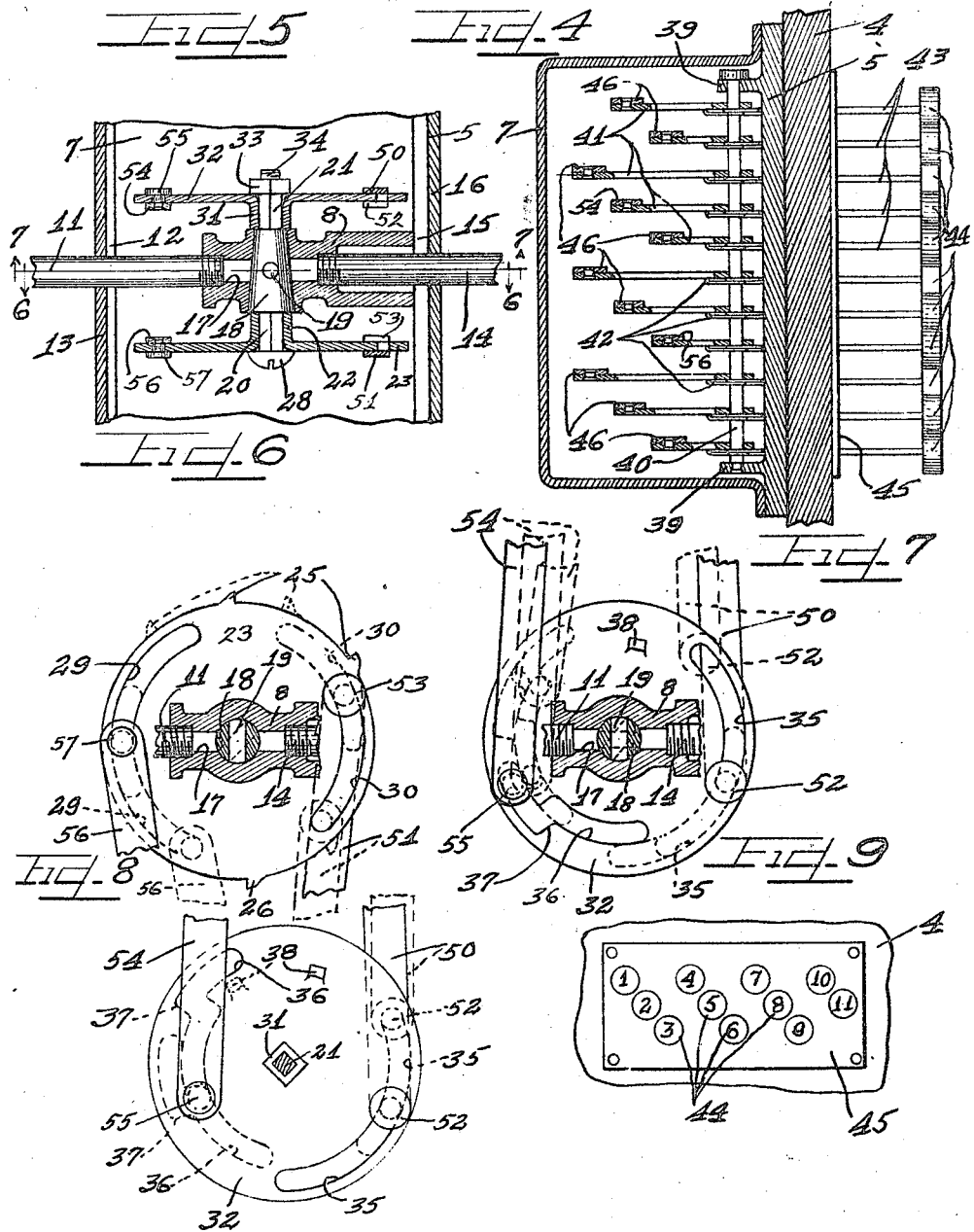

Patented Jan. 1, 1924.

1,479,192

UNITED STATES PATENT OFFICE.

FRED J. LUDDEN, OF CHICAGO, ILLINOIS.

GASOLINE COMBINATION VALVE LOCK.

Application filed April 11, 1921. Serial No. 460,528.

*To all whom it may concern:*

Be it known that I, FRED J. LUDDEN, a citizen of the United States, and a resident of the city of Chicago, in the county of Cook and State of Illinois, have invented certain new and useful Improvements in a Gasoline Combination Valve Lock; and I do hereby declare that the following is a full, clear, and exact description of the same, reference being had to the accompanying drawings, and to the numerals of reference marked thereon, which form a part of this specification.

This invention relates more particularly to an improved type of a selectively operable or combination valve lock for completely shutting off the supply of gasoline through the gasoline feed pipe of an automobile engine by locking a feed pipe control valve in closed position thereby preventing operation of the engine and obviating theft of the automobile.

It is an object of this invention to provide a combination lock for shutting off the supply of gasoline to a vehicle engine to prevent theft of the vehicle.

It is also an object of the invention to equip the gasoline supply pipe of an automobile engine with a control valve having a selectively operable locking mechanism connected therewith whereby the supply of gasoline to the engine may be cut off to prevent theft of the automobile by a person being unfamiliar with the combination controlling the locking mechanism.

Another object of the invention is the construction of a combination valve locking unit adapted to be connected in the gasoline supply pipe of an automobile and having a control key board mounted on the dash or instrument board of the automobile for convenient operation by the owner or an authorized person.

It is a further object of this invention to provide a combination valve lock in the gasoline supply pipe of a motor vehicle whereby a gasoline control valve may be locked in a closed position and unlocked only by a selective operation of certain of a plurality of key mechanisms.

It is furthermore an object of the invention to provide a valve having a plurality of key controlled mechanisms connected therewith, a selective operation of which is required to permit operation of the valve.

Another object of this invention is to construct a plurality of selectively operable mechanisms connected with a supply valve through locking disk members whereby the valve may be readily locked by the operation of any one of a plurality of said mechanisms and unlocked only by a selective operation of master mechanisms, the operating members of which are of the same general appearance as the operating members of the remaining mechanisms.

It is an important object of this invention to provide a supply line control valve with enclosed locking mechanisms adjustable only from the exterior of a housing by the selective operation of certain of a plurality of master control keys to cause opening of the valve after the same has been locked by the operation of any one of a plurality of auxiliary control keys.

Other and further important objects of this invention will be apparent from the disclosures in the specification and the drawings.

The invention (in a preferred form) is illustrated in the drawings and hereinafter more fully described.

On the drawings:

Figure 1 is a side elevation of an automobile engine the gasoline supply pipe of which has connected therein a combination valve lock embodying the principles of this invention and operable from the dash or instrument board of the automobile.

Figure 2 is an enlarged plan view of the combination valve lock with the housing removed.

Figure 3 is a sectional view taken on line 3—3 of Figure 2 showing the housing in section.

Figure 4 is an enlarged section taken on line 4—4 of Figure 3.

Figure 5 is an enlarged fragmentary detail section taken on line 5—5 of Figure 3 showing parts in elevation.

Figure 6 is a sectional view taken on line 6—6 of Figure 5 showing the operation in dotted lines.

Figure 7 is a sectional view taken on line 7—7 of Figure 5 showing the operation in dotted lines.

Figure 8 is a detail view similar to Figure 7 showing another position of adjustment in dotted lines.

Figure 9 is an elevation of the valve lock key board.

As shown on the drawings:

The reference numeral 1 indicates an automobile engine having attached thereto a carbureter 2, to which gasoline is supplied through a feed or supply pipe 3. The supply pipe 3 connects the carbureter 2 and the gasoline tank of the automobile. The automobile dash or instrument board is indicated by the reference numeral 4.

The improved combination valve lock comprises a compact unit embracing a metal base or mounting plate 5 which has the upper portion thereof rigidly secured to the front surface of the instrument board 4 by screws 6 or other suitable means. Spot welded to the base plate 5 is a cover or housing 7 used to completely enclose the lock mechanisms. A valve casing 8 is located within the housing and has apertured lugs 9 integrally formed at one end thereof. Screws 10 project through the lugs 9 and engage in the base plate 5 to hold the valve casing secured in place.

Rigidly secured in one end of the valve casing 8 is the inner end of a short length of pipe 11 which projects out of the housing 7 through an opening 12 and through an apertured disk 13 welded to the housing. The gasoline supply pipe 3 has a short section cut therefrom and the valve lock projects between the cut ends of the pipe 3. The outer end of the pipe 11 is spot welded to one cut end of the pipe 3. Also secured in the valve casing 8 is the inner end of a short length of pipe 14 which projects through an opening 15 in the base plate 5 and through an apertured disk 16 spot welded to the back of said base plate. The outer end of the short pipe length 14 is spot welded to the second cut end of the gasoline supply pipe 3. Gasoline is thus permitted to flow from the automobile gasoline tank through the pipe 3—14, then through the valve passage 17 and the pipe 11—3 to the carbureter 2.

Projecting transversely through the valve casing 8 is a tapered valve 18 having a diametric passage 19 therein adapted for communication with the valve passage 17. Integrally formed on the ends of the valve 18 are squared shanks or stems 20 and 21. Engaged on the squared shank 20 is a squared collar or sleeve 22 of a circular valve opening plate or disk 23. Formed on the interior of the housing 7 is a stop 24 adapted to be contacted by projections or teeth 25 formed on the periphery of the disk 23 to limit the rotative movement thereof. A lug or tooth 26 is also integrally formed on the periphery of the disk 23 for coaction with a plate spring 27 secured on the inner surface of the base plate 5, as illustrated in Figure 3. The disk 23 is held in place by a screw 28, which threads into the end of the squared shank 20. The disk 23 is provided with curved slots 29 and 30 substantially opposite one another.

Engaged on the valve shank 21 is a squared collar or sleeve 31 of a valve adjusting or setting disk 32. To hold the setting disk 32 in place a nut 33 is threaded onto the threaded end 34 of the valve shank 21, as shown in Figure 5. The valve adjusting disk 32 is provided with a curved slot 35 and with a bayonet-slot 36 offset at 37. Formed on the inner surface of the disk 32 is a projection or pin 38.

Formed on the inner surface of the base plate 5 are two apertured projections or posts 39 for supporting a shaft or axle 40. Pivoted on the shaft 40 in spaced relation are a plurality of bell cranks 41 each provided with an independent control spring 42. Pivoted to one end of each of the bell-cranks 41 is a rod or key stem 43 having a button or key 44 secured on the outer end thereof. There are eleven keys disclosed, the stems 43 of which slidably project through openings in the base plate 5 and in the automobile instrument board 4. The key stems 43 also project through an apertured key plate or board 45 which is rigidly secured to the instrument board 4. As illustrated in Figure 9, the buttons or keys 44 are numbered 1 to 11 respectively by means of number plates secured to said keys.

Pivotally conected to all but the fourth and the eighth bell-cranks 41 are a plurality of nine connecting rods or bars 46 of equal length and having slots 47 therein. Projecting through the slots 47 of the bars 46 is a rod or long pin bolt 48 having spacer sleeves or collars 49 thereon for separating the bars 46. Engaged on the rod 48 are two auxiliary rods or bars 50 and 51, the opposite ends of which are provided with studs or pins 52 and 53 respectively. The stud 52 of the bar 50 projects through the slot 35 of the disk 32, while the stud 53 of the bar 51 projects through the slot 30 of the disk 23.

Pivotally connected to the fourth bell crank 41 is one end of a long master rod or bar 54, the other end of which is provided with a stud or pin 55 which projects through the bayonet-slot 36 of the disk 32. Pivotally attached to the eighth bell-crank 41 is one end of a long master rod or bar 56, the other end of which is provided with a stud or pin 57 which projects through the slot 29 of the disk 23.

The operation is as follows:

As illustrated in Figure 1, the combination valve lock is mounted on the enclosed or inner surface of the automobile dash or instrument board 4 with the pipes 11 and 14 connected in the gasoline supply pipe 3. The key-board 45 is mounted on the dash or instrument board 4 in a convenient location to permit a selective operation of the control keys or buttons 44 to cause opening and closing of the control valve 18 which governs the flow of gasoline from the gasoline tank to the carbureter 2 of the engine 1.

When the valve 18 is closed, as illustrated in Figures 6 and 7, the supply of gasoline is shut off thereby making it impossible to run the automobile thus obviating theft thereof. With the valve closed it is impossible to open the same except by a selective operation of certain master keys 44 which are identical in construction to the remaining keys 44 and therefore cannot be identified by unauthorized persons.

In the combination illustrated, the two master keys are keys "4" and "8" which are connected with the respective master bars 54 and 56 by means of two of the bell-cranks 41. When the valve is closed it is locked and no gasoline is permitted to flow into the carbureter 2. To open the valve 18 the primary master key number "4" is first depressed thereby causing the respective bell-crank 41 to be pivoted to pull the master bar 54 toward the shaft 40. This movement of the bar 54 causes the stud 55 thereof working in one end of the bayonet slot 36 to partially rotate the setting disk 32 into an intermediate position wherein the valve opening or port 19 is moved from a closed position at right angles to the valve casing passage 17 into the inclined dotted line position of Figure 7. With the release of the key "4" the spring 42 of the respective bell-crank 41 acts automatically to return the key "4" to its normal position and at the same time returns the master bar 54 to position the stud 55 thereof in the offset 37 of the bayonet slot 36 illustrated in dotted lines in Figure 8. The valve 18 after the first operation is thus set in a position ready to be opened. To open the valve a second selective operation of the keys on the key-board is necessary. The second master key "8" is next depressed thereby causing the respective bell-crank to pull the master bar 56 toward the shaft 40. This movement of the bar 56 causes the stud 57 thereof to partially rotate the disk 23 from the position shown in Figures 3 and 6 into the dotted line position of Figure 6. With the above mentioned partial rotation of the control disk 23 the valve 18 is simultaneously rotated from the position wherein the valve port 19 is inclined, into full open position wherein the valve port 19 is in register with the passage 17 of the valve casing 8. As the disk 23 is rotated to open the valve the projection or lug 26 of said disk is moved to engage behind the spring 27 which acts to hold the valve in its open position. The two teeth 25 on the disk 23 coact with the housing stop 24 to limit the throw or rotation of the disk 23. Upon release of the key "8" the respective bell-crank spring 42 acts automatically to return the key "8" to normal position together with the master bar 56. With the movement of the disk 23 to open the valve, the disk 32 is simultaneously rotated into the full line position of Figure 7 wherein the stud 55 is located at the inner end of the bayonet slot 36.

The rotation of the disks 32 and 23 caused by the selective operation of the valve opening or master keys "4" and "8" positions the studs 52 and 53 at the opposite ends of the respective disk slots 35 and 30.

The closing and locking of the valve is accomplished very easily. This is done by depressing any one of the valve closing keys numbered 1, 2, 3, 5, 6, 7, 9, 10 or 11. By depressing, for example key "3" the respective auxiliary bar 46 is actuated thereby causing the common rod 48 to move toward the shaft 40. The rod 48 when pulled moves in the slots 47 of the remaining bars 46 without disturbing the positions of the control keys on the key-board all of which are independently operable. Movement of the rod 48 of course simultaneously tensions or pulls both of the auxiliary bars 50 and 51 toward the shaft 40 thereby causing the studs 52 and 53 to rotate the respective disks 32 and 23 back into the full line positions of Figures 6 and 7. This return rotation of the disks 32 and 23 of course rotates the valve 18 from its open position back into its closed position to shut off the supply of gasoline to the carbureter.

As the disk 23 is moved back from the dotted line position of Figure 6 into the full line position the lug 26 pushes past the spring 27 which is temporarily deflected by the passing of said lug. With the closing of the valve caused by the depression of the key "3" the disk 32 is rotated so that the projection 38 thereon is moved from the full line position of Figure 8 toward the dotted line position thereof. As the lug 55 reaches the offset 37 in the bayonet slot 36 the projection 38 comes into contact with the master bar 54 and pushes the same outwardly thereby moving the lug 55 into the outer end of said bayonet slot 36, as illustrated in full lines in Figure 7.

It will thus be noted that while a selective operation of the master keys "4" and "8" is required to open the gasoline control valve 18, any one of the other keys may be operated independently of the others to effect a locking or closing of the valve 18. A person unfamiliar with the valve lock combination could therefore not unlock or open the gasoline control valve 18 and theft of the automobile is accordingly impossible.

I am aware that numerous details of construction may be varied through a wide range without departing from the principles of this invention, and I therefore do not purpose limiting the patent granted otherwise than necessitated by the prior art.

I claim as my invention:

1. The combination with a vehicle engine and the gasoline supply line thereof, of a valve connected in said supply line, controlling mechanisms connected with said valve, a casing for enclosing said valve and said mechanisms, and a plurality of keys connected with said controlling mechanisms, said valve adapted to be opened by a selective operation of certain of said keys and further adapted to be closed by the operation of any one of the remaining keys.

2. The combination with an engine gasoline supply line, of a valve lock mechanism connected therein, a plurality of auxiliary key mechanisms connected therewith any one of which may be independently operated to effect a closing of said valve lock mechanism, and a plurality of master key mechanisms connected with said valve lock mechanism and adapted to be selectively operated to effect an opening of said valve lock mechanism.

3. The combination with a valve, of locking means connected therewith, a plurality of independently operable key mechanisms connected with said locking means any one of which may be operated to effect a closing of said valve, and a plurality of master key mechanisms connected with said locking means required to be selectively operated to cause opening of said valve.

4. A combination valve lock device comprising a housing, a valve casing therein, a gasoline supply line pipe projecting through said housing and connected with said valve casing, a valve in said valve casing, slotted control disks connected with said valve to operate therewith, a plurality of independently operable closing mechanisms connected with said disks any one of which may be operated to effect adjustment of said disks to close said valve, and a plurality of master mechanisms connected with said disks adapted to be selectively operated independently of said closing mechanisms to effect a closing and a locking of said valve.

5. A combination valve lock device comprising a housing, a valve casing secured therein, a gasoline supply line pipe projecting through said housing and connected with said valve casing, a valve in said valve casing, slotted control disks mounted on the ends of said valve, and operable therewith, a primary means connected with one of said disks adapted to be operated to cause setting of said valve, master means connected with the other disk adapted to be operated after the operation of said primary means to cause opening of the valve from its adjusted position, and a plurality of independently operable valve closing mechanisms connected with said disks any one of which may be operated without disturbing the others to move said valve from open to closed position to shut off the flow of gasoline through said gasoline supply line pipe.

6. A combination valve lock comprising a housing, a fuel supply pipe projecting therethrough, a valve in said housing connected in said pipe, a slotted valve setting disk connected with said valve, a slotted valve opening disk also connected with said valve, key operated primary means connected with said valve setting disk adapted to be operated to cause said valve to be moved from a closed into an adjusted position preliminary to open position, key operated secondary means connected with said slotted valve opening disk adapted to be operated after operation of said primary means to cause opening of said valve to permit a flow of fuel through said supply pipe, a stop in said housing, projections on said valve opening disk adapted to engage said stop to limit the movement of said disks and valve, a resilient member mounted in said casing, a lug formed on said valve opening disk adapted to co-act with said resilient member to hold the valve set in open position against accidental closing, and a plurality of key operated valve closing mechanisms connected with both of said disks, any one of said closing mechanisms adapted to be operated independently of the others to effect a closing of said valve to shut off the flow of fuel through said supply pipe.

7. A combination valve lock comprising a housing, a gasoline supply pipe projecting therethrough, a control valve in said housing connected in said pipe, valve operating mechanisms in said housing connected with said valve, a key board, and a plurality of keys thereon connected with said valve operating mechanisms, said keys adapted to be selectively operated to cause opening and closing of said valve.

8. A combination valve lock comprising a housing adapted to be mounted on the enclosed side of an automobile dash, a gasoline supply pipe projecting through the housing and adapted to be connected in the gasoline pipe of the automobile, a key board mounted on the exposed surface of the dash for convenient access, a valve in said housing for controlling the flow of gasoline through said gasoline supply pipe, valve control members secured to said valve within said housing, spring controlled master mechanisms within said housing connected with said valve control members, master keys on said key board connected with said master mechanisms and adapted to be selectively operated to effect a setting and an opening of said valve to permit gasoline to flow through said supply pipe, a plurality of auxiliary mechanisms in said housing connected with said valve control members, and a plurality of auxiliary keys on said key board similar in appearance to said master keys, any one of said auxiliary keys adapted to be operated independently of the others to cause a closing of said valve.

9. The combination with a gasoline supply pipe, of a valve connected therein, adjustable control members connected with said valve, key operated master mechanisms connected with said control members and required to be operated in combination to effect an opening of said valve, a rod, bars connecting the rod with said control members, and a plurality of key operated auxiliary mechanisms connected with said rod, any one of which may be operated independently of the others to actuate said bars to cause operation of the control members and closing of said valve.

10. The combination with a supply line, of a valve therein, slotted disks connected with the valve, control bars connected with said disks, and a plurality of key mechanisms adapted to be selectively operated to cause a selective operation of the control bars whereby the disks are actuated to cause opening of the valve.

In testimony whereof I have hereunto subscribed my name in the presence of two subscribing witnesses.

FRED J. LUDDEN.

Witnesses:
 FRED E. PAESLER,
 JAMES M. O'BRIEN.